Figure 1:
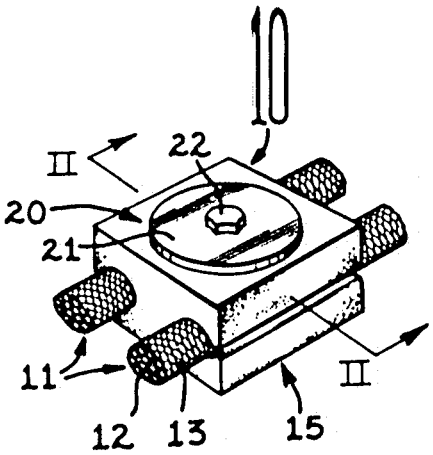
Figure 2:
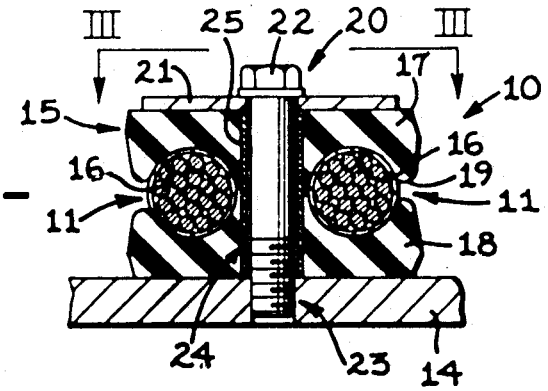
Figure 3:
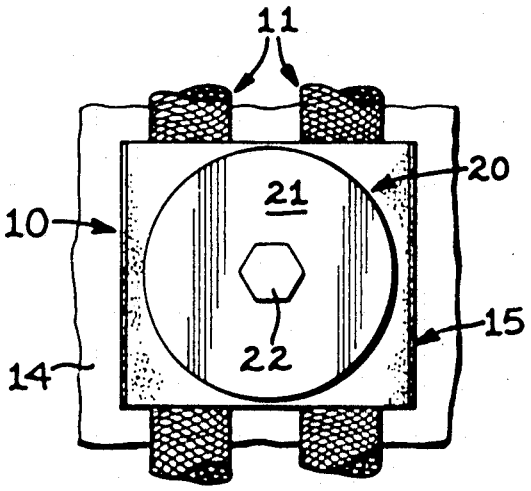
Figure 4:
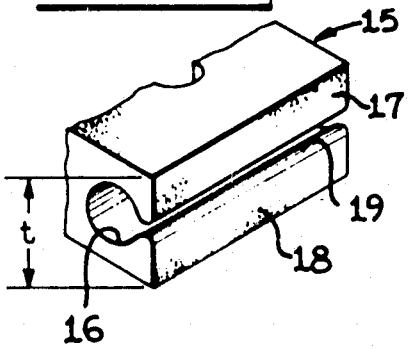

United States Defensive Publication [19] (H) [11] T100,605

Christian [43] May 5, 1981

[54] CABLE CLAMP WITH COMPRESSION LIMIT STOP

[76] Inventor: Robert L. Christian, 3855 Graces La., Decatur, Ill. 62521

[21] Appl. No.: 105,805

[22] Filed: Dec. 20, 1979

Related U.S. Application Data

[63] Continuation of Ser. No. 12,161, Jan. 10, 1979, abandoned.

[51] Int. Cl.[1] ..... F16L 3/22; H01R 7/24

[52] U.S. Cl. ..... 248/68 R; 174/166 R; 248/68CB; 339/246

[57] ABSTRACT

A clamp (10) is particularly adapted for use on a construction vehicle for clamping one or more battery cables (11) thereon. The clamp (10) permits longitudinal adjustment of the cables (11) while yet limiting the degree of compression imparted thereto to prevent shredding of the electrical insulation (13) thereof. The clamp (10) comprises a support (14) and a clamping member (21) having an elastomeric pad (15) compressed therebetween and a stop (25) for limiting the degree of compression imparted to the pad (15).

21 Claims, 1 Sheet Drawing,

10 Pages Specification

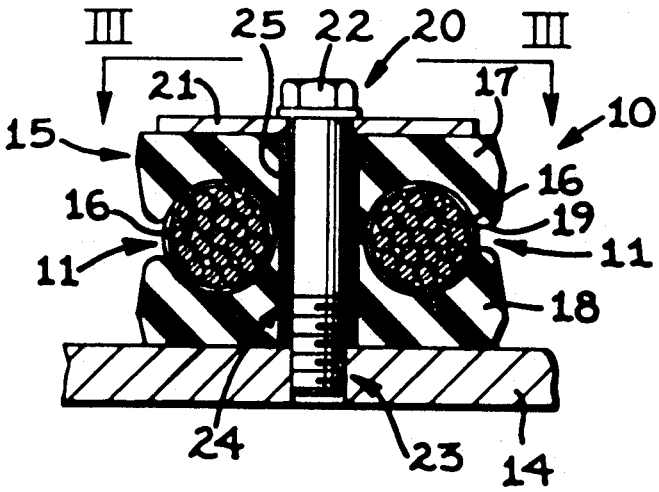

The file of this unexamined application may be inspected and copies thereof may be purchased (849 O.G. 1221, Apr. 9, 1968).